United States Patent [19]

Sommerfeld

[11] Patent Number: 5,321,120
[45] Date of Patent: Jun. 14, 1994

[54] COPOLYAMIDE ADHESIVE COMPOSITIONS CONTAINING ASYMMETRIC ALIPHATIC RESIDUES

[75] Inventor: Eugene G. Sommerfeld, Danvers, Mass.

[73] Assignee: Bostik, Inc., Middleton, Mass.

[21] Appl. No.: 9,291

[22] Filed: Jan. 26, 1993

[51] Int. Cl.⁵ ............................................ C08G 69/26
[52] U.S. Cl. .................................... 528/349; 528/338; 528/339; 528/339.3; 528/340; 528/346; 528/347
[58] Field of Search ............ 528/349, 338, 339, 339.3, 528/340, 347, 346

[56] References Cited

U.S. PATENT DOCUMENTS

| | | | |
|---|---|---|---|
| 3,842,046 | 10/1974 | Schmitt et al. | 528/349 |
| 4,476,280 | 10/1984 | Poppe et al. | 528/349 |
| 4,566,931 | 1/1986 | Panoch et al. | 156/330.9 |
| 4,617,342 | 10/1986 | Poppe et al. | 528/349 |
| 4,853,460 | 8/1989 | Harman | 528/339.3 |
| 4,937,322 | 6/1990 | Barthelemy | 528/349 |
| 5,081,223 | 1/1992 | Paschke et al. | 528/349 |

Primary Examiner—John Kight, III
Assistant Examiner—P. Hampton-Hightower
Attorney, Agent, or Firm—David G. Conlin; George W. Neuner

[57] ABSTRACT

Copolyamide adhesive compositions have a diamine component and a dicarboxylic acid component. The diamine component includes the reaction residues of at least two diamines selected from non-cyclic aliphatic diamines, cycloaliphatic diamines, and aromatic diamines. The dicarboxylic acid component includes the reaction residues of at least two dicarboxylic acids selected from non-cyclic aliphatic dicarboxylic acids, cycloaliphatic dicarboxylic acids, and aromatic dicarboxylic acids. One of the residues is mono-alkyl branched asymmetric. The composition is free from aliphatic omega aminocarboxylic acids or lactams having 12 carbon atoms or less. When one of the dicarboxylic acids is a polymerized fatty acid, the diamine component does not contain a cycloaliphatic diamine.

30 Claims, No Drawings

COPOLYAMIDE ADHESIVE COMPOSITIONS CONTAINING ASYMMETRIC ALIPHATIC RESIDUES

FIELD OF THE INVENTION

This invention is related to the field of polyamide adhesives, particularly to copolyamide adhesive compositions, and more particularly to compositions that can be heat or steam activated.

BACKGROUND OF THE INVENTION

The use of copolyamides as thermoplastic adhesives has long been known. They have been found useful for bonding textiles where many modifications have been made to improve hot water resistance.

U.S. Pat. No. 3,839,121 discloses thermoplastic adhesives based on copolyamides containing branched chain diamine components which give improved resistance to washing solutions. West German Application No. 3,005,939 also discloses copolyamides containing singly branched $C_{10}$-diamines such as 5-methylnonamethylene diamine.

U.S. Pat. No. 4,566,931 describes copolyamides based on dicarboxylic acids, diamines and omega aminocarboxylic acids or lactams used to heat seal textiles, where the copolyamides comprise: (1) 20 to 80% by weight of one or more aliphatic omega aminocarboxylic acids or lactams having 6 to 12 carbon atoms in the chain; and (2) 80 to 20% by weight of equimolar mixtures o one or more aliphatic dicarboxylic acids having 6 to 12 carbon atoms with a diamine selected from aliphatic alpha-omega diamines and, optionally, cycloaliphatic diamines having 6 to 12 carbon atoms, where at least 30% by weight of these diamines consist of singly branched aliphatic diamines having 6 carbon atoms.

Semicrystalline copolyamides having a $T_g$ greater than 142° C. wherein the acid is terephthalic acid or a derivative thereof are described in U.S. Pat. No. 4,937,322.

U.S. Pat. No. 4,853,460 describes polyamide adhesive compositions having a long open assembly time of at least 45 seconds wherein the acid component consists essentially of a polymeric fatty acid and a dicarboxylic acid and the amine component consists essentially of (i) a cyclic aliphatic diamine, (ii) a non-cyclic aliphatic diamine in which the amine groups are bonded to odd-numbered carbon atoms on the aliphatic chain, e.g. 2-methyl-1,5-pentanediamine, and (iii) an alkylene diamine, with or without (iv) a polyglycoldiamine.

Copolyamides have also been used as an adhesive that can be steam activated to bond ridged foam and a foam/fabric bilaminate. A copolyamide containing e-caprolactam/hexamethylenediamineadipic acid/hexamethylenediamine-sebacic acid (conventionally designated as 6/66/610) in a weight ratio of 37/28/35 (melting point, $T_m$, about 140°–145° C.) can be steam activated, but contains free e-caprolactam retained from the process and, as well, continues to yield this monomer when subjected to elevated temperatures and humidity. This results in fogged windows when used for bonding interior auto components such as seating fabric, panel laminates, carpeting, etc.

The "fog" problem results from the presence of a light scattering film on the interior of an automobile windshield or other interior Window surfaces The film is caused by material transported to the window glass by distillation of volatile compounds contained in materials such as adhesives used for interior components of the automobile. Oxidation of the original condensate can contribute to the complexity of the problem.

It would be desirable to have a fog-free, rapidly heat activatable (preferably by steam heat) copolyamide adhesive composition for such uses.

SUMMARY OF THE INVENTION

Preferred compositions of the present invention provide such a fog-free heat activatable copolyamide adhesive composition. In accord with one embodiment of the present invention, copolyamide adhesive compositions comprise a diamine component and a dicarboxylic acid component, wherein the diamine component comprises the reaction residues of at least two diamines selected from non-cyclic aliphatic diamines, cycloaliphatic diamines, and aromatic diamines and the dicarboxylic acid component comprises the reaction residues of at least two dicarboxylic acids selected from non-cyclic aliphatic dicarboxylic acids, cycloaliphatic dicarboxylic acids, and aromatic dicarboxylic acids, wherein one of the residues is asymmetric mono-alkyl branched, and wherein the composition is free from aliphatic omega aminocarboxylic acids or lactams having 12 carbon atoms or less, with the proviso that when one of the dicarboxylic acids is a polymerized fatty acid, the diamine component does not contain a cycloaliphatic diamine. Such polyamide compositions of the invention typically have a $T_g$ less than about 100° C., preferably less than about 60° C.

In accord with another embodiment of the present invention, copolyamide adhesive compositions comprise a diamine component and a dicarboxylic acid component, wherein the diamine component comprises the reaction residues of at least two diamines selected from aliphatic or cycloaliphatic diamines having from about 5 to about 18 carbon atoms and the dicarboxylic acid component comprises the reaction residues of at least two dicarboxylic acids selected from aliphatic or cycloaliphatic dicarboxylic acids having from about 5 to about 18 carbon atoms, wherein one of the residues is asymmetric mono-alkyl branched, and wherein the composition is free from aliphatic omega aminocarboxylic acids or lactams having 12 carbon atoms or less.

Advantageously, the mono-alkyl branched, asymmetric residue portion is present in amounts of at least about 10 mole % based on either the total moles of diamine or the total moles of dicarboxylic acid. Preferably, the asymmetric portion is present in the range of about 10 to about 90 mole %, more preferably in the range of about 25 to about 80 mole %, and most preferably in the range of about 45 to about 75 mole %.

As used herein "residue" refers to the portion of the diamine molecule or the dicarboxylic acid molecule that is the condensation reaction product forming a part or segment of the polymer.

When aromatic diamines are used, advantageously, they are used in amounts less than about 35 mole %, based on the total amount of diamines. Aromatic dicarboxylic acids can be advantageously used in similar amounts based on the total amount of dicarboxylic acids.

DETAILED DESCRIPTION OF THE INVENTION

Copolyamide compositions of the present invention have an amide concentration of at least 0.5 amide moieties per 1000 g of polymer. Preferred copolyamide compositions of the present invention are steam activatable and provide flowing, wetting and adhering properties at temperatures below the dry melting point. Such steam activatable compositions have an amide concentration of at least about 5 amide moieties per 1000 g of polymer, preferably in the range of about 5 to 8.85 amide moieties/1000 g, more preferably at least 7 amide moieties/1000 g, and most preferably in the range of about 7.5 to 8.85 amide moieties/1000 g.

Diamines useful in the practice of the present invention include all diamines which, when combined with selected dicarboxylic acids, form polyamides having a $T_g$ less than 100° C. In certain preferred embodiments of the invention, aliphatic diamines have from about 5 to 16 carbon atoms and are preferably alpha omega diamines such as, for instance, hexamethylene diamine, dodecamethylene diamine, decamethylene diamine, nonamethylene diamine, and mixtures thereof and, illustratively, the cycloaliphatic diamines such as isophorone diamine, piperazine, and the like. In other preferred embodiments, useful aliphatic diamines include polyalkylether diamines such as, for example, polyoxyethylene diamine and polyoxypropylene diamine, and the like. Preferably, such polyalkylether diamines have a molecular weight, $M_n$, in the range of about 100 to about 4000. Such aliphatic polyether diamines are preferably used in an amount from about 2% to about 35% by weight based on the total weight of polyamide solids.

The proportion of cycloaliphatic diamines to the total portion of diamines is from 0 to about 70 mole % of the total diamines and, advantageously in accord with the present invention, cycloaliphatic diamines are not used when a polymerized fatty acid is used as one of the dicarboxylic acids.

The asymmetric mono-alkyl branched diamine can be any such diamine having from about 5 to about 18 carbon atoms. In one embodiment of the invention, asymmetrical mono-alkyl branched odd carbon diamines are preferred. Odd carbon diamines are those that add an odd number of carbon atoms to the backbone chain of the polyamide.

In certain preferred embodiments, mono-alkyl branched asymmetric diamines having 5 or 6 carbon atoms have been found advantageous. Preferred such diamines includes, for example, 2-methyl-1,5-pentanediamine (odd), 2-ethyl-1,4-butanediamine (even) and 1-ethyl-1,3-propanediamine (odd).

Dicarboxylic acids useful in the practice of this invention include all such acids which, when combined with selected diamines, form polyamides having a $T_g$ less than 100° C. Examples of such dicarboxylic acids include, for instance glutaric acid, adipic acid, suberic acid, azelaic acid, sebacic acid, undecanediopic acid (nonane dicarboxylic acid), dodecanedioic acid (decane dicarboxylic acid), undecane dicarboxylic acid, dodecane dicarboxylic acid, polymerized fatty acids (dimer, trimer, etc.), cyclohexane dicarboxylic acid, phthalic acid, isophthalic acid, terephthalic acid, and the like. Acid anhydrides and lower alkyl esters of dicarboxylic acids (e.g. methyl and ethyl esters) can be used to supply the dicarboxylic acid residue in the polymer chain. In certain preferred embodiments, the dicarboxylic acids have from about 5 to about 18 carbon atoms. Specific polymerized fatty acids include, e.g., Humko TM 3695 and Empol TM 1014.

The amount of cycloaliphatic dicarboxylic acids is preferably from 0 to about 70 mole % based on the total dicarboxylic acids.

The asymmetric mono-alkyl branched dicarboxylic acid can be any such dicarboxylic acid having from about 5 to about 18 carbon atoms. In one embodiment of the invention, asymmetrical monoalkyl branched odd carbon dicarboxylic acids are preferred. Odd carbon dicarboxylic acids are those that add an odd number of carbon atoms to the backbone chain of the polyamide.

In certain preferred embodiments, mono-alkyl branched asymmetric dicarboxylic acids having 5 or 6 carbon atoms have been found advantageous.

Preferred copolyamides, in accord with the invention are unbalanced being acid terminated and having amine values <1.5 or being amine terminated and having acid values <1.5. The acid + amine values obtained by titration, expressed in mg KOH/g, are preferably in the range of about 5 to about 18, more preferably in the range of about 10 to about 16. By end group analysis, the the number average molecular weight, $M_n$, is preferably in the range of from about 6,000 to about 22,000, more preferably in the range of about 7,000 to about 11,000. The GPC (gas phase chromatography) molecular weights, $M_n$, are generally 1000-2000 higher.

In certain preferred embodiments of the invention, the more desirable copolyamides are rapidly steam activatable and have a dry melting point in the range of about 130° to 160° C.

The techniques and general method of polymerizing the mixed reactants is generally well known; see, for example U.S. Pat. Nos. 3,377,303 and 4,343,743. In general, the polyamides of this invention can be prepared by charging a resin kettle with the reactants, in proportions calculated to produce the desired copolyamides, and heating the mixture to a temperature at which random polymerization occurs. Typically, for convenience herein, the quantities of diamine and dicarboxylic acid are calculated for each polyamide of the copolyamide, as if each were to be prepared separately. However, the quantities of mixed diamines and dicarboxylic acids can be reacted simultaneously to produce random polymerization and the resulting composition, for purposes of this invention, is considered a copolymer and can be designated using the polyamides for which the calculation is made. Molecular weight can be controlled by the use of monofunctional amines or monofunctional carboxylic acids or terminating agents, or by use of an unbalanced stoichiometric charge of diamines and dicarboxylic acids.

In general, the reactants are heated to a temperature of from about 120° to 130° C. at which point polymerization is initiated and water starts to distill off. Thereafter, a temperature is maintained that is sufficient to continuously distill off the water of condensation. Preferably, the heating is carried out under an inert gas atmosphere such as under a blanket of nitrogen gas. To assist the polymerization, a polymerization catalyst may be added in a catalytic proportion. Representative of such catalysts are phosphoric acid, sodium benzenephosphonate and sodium benzenphosphinate. To reduce foaming during water distillation, a small quantity of a surface active agent such as, for example, Carbowax TM 3350 can be used. The heating of the reaction mixtures may be carried out until water distillation ceases. Vacuum may be applied to remove final traces of water. Final viscosity of the reaction mixture is generally about 50-5000 poise at 180° C., preferably 100-4000 poise at 180° C. and more preferably 1000-3000 poise at 180° C.

The polyamide compositions of the present invention can be activated by dry heat, steam, and dielectric techniques. The polyamide polymers of the present invention can be converted into a variety of forms including, for example, granules, pellets, powder, powder dispersions, pastes, films and webs (i.e., open weave net-like structures).

Copolyamide compositions in accord with the present invention are useful as textile adhesives and nonwoven binders. Preferred compositions resist repeated dry cleaning and home laundering. The copolyamide compositions of this invention are advantageous for their adhesive strengths after activation for adhering to a variety of materials including ridged and flexible foams, fiber glass cloths, and vinyls such as plasticized polyvinylchloride. They are also useful with natural rubber, polyurethanes, neoprene, styrene-butadiene copolymers, butadiene, ABS and other polymeric materials.

The compositions of the invention can be used to bond both porous and nonporous, rigid or flexible, natural or synthetic material. They may be employed to adhere leather, suede, and both woven and nonwoven fabrics obtained from cotton, wool, silk, sisal, hemp, jute, fiber glass and synthetic fibers such as rayon, nylons, acrylics, polyesters, polyolefins and the like. The present resin compositions are similarly useful for hot melt bonding rigid materials such as metals, including aluminum, steel, wood, paper products, phenolics, cork, pressboard, glass and the like. Preferred copolyamides of the invention are useful for applications such as cable sealants, automotive trim adhesives and product assembly adhesives that require the combination of excellent high and low temperature resistance.

The following examples are provided to further illustrate the invention.

EXAMPLE 1

(Preparation of Copolyamide A6/66/610, 53/7/40 Wt. Ratio.) acid/amine stoichiometry (acid termination). Charged Molecular weight control is obtained via unbalanced acid/amine stoichiometry (acid termination). Charged stoichiometry yields an acid value–amine value $=\Delta 14.5$ which is adjusted to $\Delta 13.5$ before the vacuum stage.

A 3 liter 4-necked resin kettle was fitted with (a) an agitator, (b) an 1 liter pressure equalized addition funnel, (c) a batch temperature thermocouple, and (d) a 10" packed fractionating column fitted with a water cooled variable take-off head with a vapor temperature thermocouple and $H_2O$ collection vessel.

The resin kettle was charged with 494.15 g. sebacic acid, 668.30 g. adipic acid, 591.7 g. deionized $H_2O$, 3.28 g. carbowax 3350 and 4.31 g. sodium benzenphosphinate. The mixture was agitated and heated under a nitrogen blanket to 60° C. at which point a mixture, consisting of 477.78 g. 70% 1,6-hexamethylene diamine in water and 454.11 g. 2-methyl 1,5-pentanediamine, was added to the resin kettle over a 45 ' (minute) period through a 1 liter pressure equalized addition funnel while mixing. External heat was applied to augment reaction exotherm to bring batch temperatures to a 113°-118° C. with $H_2O$ reflux. The reactor contents were held ½ hr. at $H_2O$ reflux. Water take off was begun ($N_2$ sweep 2 SCFH) through the packed fractionating column as batch temperature gradually increased to 220°-230° C. The vapor temperature was not permitted to exceed 100° C. during take-off. Water take off rate decreased as the batch temperature approached 220° C. The batch was held at 220°-230° C. for ½ hr. removing as much remaining $H_2O$ as possible.

Total distillate $=957.3$ g.

Batch acid value $=17.14$ mg KOH/g.

Batch amine value $=2.88$ mg KOH/g.

$\Delta$ (acid-amine value) $=14.26$ mg KOH/g.

$\Delta$ 14.26–$\Delta$13.5 (target) $=0.76$ mg KOH/g.

Batch amine adjustment was made dropping the $\Delta$14.26 by 0.76 to a theoretical $\Delta$13.5 (target value). Thus, 0.8155 g. 70% 1,6-hexamethylene diamine in $H_2O$ plus 0.7759 g. 2-methyl-1,5-pentanediamine were injected into the reactor and the batch was held at temperature for an additional 45 minutes ($H_2O$ distillate total $=958.5$ g.). While holding batch temperature at 220°-230° C., vacuum was applied to the reactor ($<5$ mm Hg) to remove residual $H_2O$. Vacuum was broken after one hour with $N_2$ (8.7 g. distillate collected). The polyamide was dropped out of the reactor, cooled, annealed, granulated, pulverized and dried. Final constants: acid value $=14.37$; amine value $=0.4$; $=13.97$; acid+amine value $=14.77$ mg KOH/g (total end groups); calculated $M_n=7,956$ (from end groups); GPC $M_n=9,512$, $M_w=12,165$; DSC $T_g=46.4°$ C.; $(T_m)=152.82°$ C.

DSC was run on DuPont Model 9900. The sample was vacuum dried for 24 hours at 75° C. $T_g$ and $T_m$ were determined on second heat.

EXAMPLES 2-8

The copolyamides of Examples 2-8 were made by the same method described above in Example 1. The reactants were charged into the reactor to provide the final calculated composition as set forth in Table 1.

TABLE 1

| Example No. | Weight % Calculated Polyamide | | | | |
|---|---|---|---|---|---|
| | A[1][6] | 66 | 69 | 610 | 6[2] |
| 1 | 53 | 7 | — | 40 | — |
| 2 | 58 | 7 | — | 35 | — |
| 3 | 51 | 14 | — | 35 | — |
| 4 | 37 | 28 | — | 25 | — |
| 5 | 65 | — | 17.5 | 17.5 | — |
| 6 | 65 | — | — | 35 | — |
| 7 | 51 | 14 | 35 | — | — |
| 8 (Control) | — | 28 | — | 35 | 37 |

[1] A is 2-methyl-1,5-pentanediamine
[2] ε-Caprolactam

The properties of the copolyamides of Examples 2-8 are tabulated in Table 2 below.

TABLE 2

| Example No. | Acid + Amine Value[3] | $T_g$[4] °C. | $T_m$[4] °C. | Viscosity Poise, 180° C. | $M_n$ End Grp | $M_n$ GPC |
|---|---|---|---|---|---|---|
| 1 | 13.6 | 50 | 150, 158 | 2400 | 8250 | 9316 |
| 2 | 14.9 | 53 | 156 | 2190 | 7500 | 7202 |

TABLE 2-continued

| Example No. | Acid + Amine Value[3] | $T_g$[4] °C. | $T_m$[4] °C. | Viscosity Poise, 180° C. | $M_n$ End Grp | $M_n$ GPC |
| --- | --- | --- | --- | --- | --- | --- |
| 3 | 15.7 | 41 | 152 | — | 7146 | — |
| 4 | 12.5 | — | 180 | — | 9005 | — |
| 5 | 13.7 | 44 | 135 | — | 8166 | — |
| 6 | 15.1 | 50 | 142 | — | 7426 | — |
| 7 | 14.1 | — | 152, 165 | — | 7937 | — |
| 8 | ~12 | 34 | 143 | 2100 | 9350 | 11329 |

[3]Amine value is <1.
[4]DSC

The invention has been described including the preferred embodiments thereof. However, it will be appreciated that those skilled in the art, upon consideration of the specification above, may make improvements within the spirit and scope of this invention.

I claim:

1. A copolyamide adhesive composition comprising a diamine component and a dicarboxylic acid component,
    said diamine component having at least two diamines selected from the group consisting of noncyclic aliphatic diamines, cycloaliphatic diamines, and aromatic diamines and
    said dicarboxylic acid component having at least two dicarboxylic acids selected from the group consisting of noncyclic aliphatic dicarboxylic acids, cycloaliphatic dicarboxylic acids and aromatic dicarboxylic acids,
    wherein one of the diamines or dicarboxylic acids is an asymmetric mono-alkyl branched monomer, and
    wherein the composition is free from aliphatic omega aminocarboxylic acids or lactams having 12 carbon atoms or less,
    with the proviso that when the dicarboxylic acid component contains a polymerized fatty acid, the diamine component is free from cycloaliphatic diamines,
    wherein the copolyamide has a $T_g$ less than 100° C.

2. The composition of claim 1 wherein the copolyamide has a $T_g$ less than 60° C.

3. The composition of claim 1 wherein the asymmetric monomer is a diamine.

4. The composition of claim 1 wherein the asymmetric monomer is present in an amount in the range of about 10 to about 90 mole % based on the total moles of one of said components.

5. The composition of claim 1 wherein the asymmetric monomer is present in an amount in the range of about 25 to about 80 mole % based on the total moles of one of said components.

6. The composition of claim 1 wherein the asymmetric monomer is present in an amount in the range of about 45 to about 75 mole % based on the total moles of one of said components.

7. The composition of claim 1 wherein the diamines have from about 5 to about 18 carbon atoms.

8. The composition of claim 1 wherein the dicarboxylic acids have from about 5 to about 18 carbon atoms.

9. The composition of claim 1 wherein the asymmetric monomer is 2-methyl-1,5-pentanediamine.

10. The composition of claim 1 produced from 2-methyl-1,5-pentanediamine, 1,6-hexamethylenediamine, adipic acid and sebacic acid.

11. The composition of claim 1 produced from 2-methyl-1,5-pentanediamine, 1,6-hexamethylenediamine, adipic acid, azeleic acid and sebacic acid.

12. The composition of claim 1 wherein the asymmetric monomer is a dicarboxylic acid.

13. The composition of claim 1, further comprising aliphatic polyether diamine in an amount of from about 2% to about 35 % by weight based on the total weight of the polyamide solids.

14. A copolyamide adhesive composition comprising a diamine component and a dicarboxylic acid component,
    said diamine component having at least two diamines selected from the group consisting of aliphatic or cycloaliphatic diamines having from about 5 to about 18 carbon atoms and
    said dicarboxylic acid component having at least two dicarboxylic acids selected from the group consisting of aliphatic or cycloaliphatic dicarboxylic acids having from about 5 to about 18 carbon atoms,
    wherein one of the diamines or dicarboxylic acids is an asymmetric mono-alkyl branched monomer,
    wherein the composition is free from aliphatic omega aminocarboxylic acids or lactams having 12 carbon atoms or less and
    wherein the copolyamide has a $T_g$ less than 100° C.

15. The composition of claim 14 wherein the copolyamide has a $T_g$ less than 60° C.

16. The composition of claim 14 wherein the asymmetric monomer is a diamine.

17. The composition of claim 14 wherein the asymmetric monomer is present in an amount in the range of about 10 to about 90 mole % based on the total moles of one of said components.

18. The composition of claim 14 wherein the asymmetric monomer is present in an amount in the range of about 25 to about 80 mole % based on the total moles of one of said components.

19. The composition of claim 14 wherein the asymmetric monomer is present in an amount in the range of about 45 to about 75 mole % based on the total moles of one of said components.

20. The composition of claim 14 wherein the asymmetric monomer is 2-methyl-1,5-pentanediamine.

21. The composition of claim 14 produced from 2-methyl-1,5-pentanediamine, 1,6-hexamethylenediamine, adipic acid and sebacic acid.

22. The composition of claim 14 produced from 2-methyl-1,5-pentanediamine, 1,6-hexamethylenediamine, adipic acid, azeleic acid and sebacic acid.

23. The composition of claim 14 wherein the asymmetric monomer is a dicarboxylic acid.

24. The composition of claim 14 having a $T_m$ in the range of about 130 to about 160° C.

25. The composition of claim 14, further comprising an aliphatic polyether diamine in an amount of from about 2% to about 35% by weight based on the total weight of the polyamide solids.

26. The composition of claim 1 having a $T_m$ in the range of about 130 to about 160° C.

27. The composition of claim 1, having aromatic diamines in an amount less than 35 mole % based on the total amount of amines.

28. The composition of claim 14, having aromatic diamines in an amount less than 35 mole % based on the total amount of amines.

29. The composition of claim 1, having aromatic dicarboxylic acids in an amount less than 35 mole % based on the total amount of dicarboxylic acids.

30. The composition of claim 14, having aromatic dicarboxylic acids in an amount less than 35 mole % based on the total amount of dicarboxylic acids.

* * * * *